Dec. 4, 1934.  O. WILSON  1,982,894
ANTIFRICTION BEARING
Filed June 5, 1934
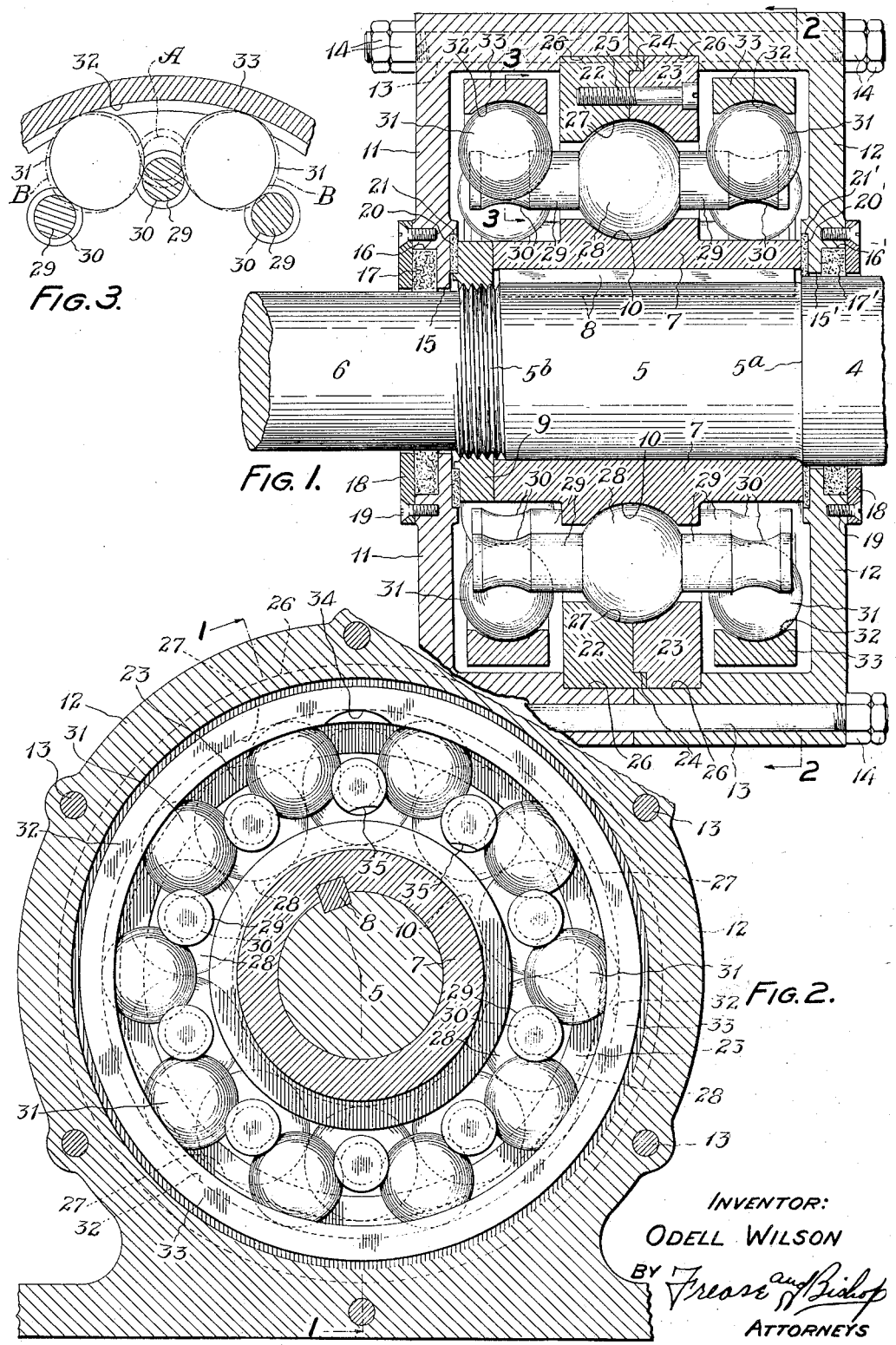
INVENTOR:
ODELL WILSON
BY *Frease and Bishop*
ATTORNEYS Patented Dec. 4, 1934

1,982,894

UNITED STATES PATENT OFFICE 1,982,894

ANTIFRICTION BEARING

Odell Wilson, Auburn, Calif.

Application June 5, 1934, Serial No. 729,041

3 Claims. (Cl. 308—206)

The invention relates to anti-friction bearings, and more particularly to a bearing construction including rotatable bearing members which carry both thrust and radial loads, in which the bearing may be operated for an indefinite period of time without grease or other liquid lubricant.

Furthermore, the invention relates to an anti-friction bearing construction of the type in which means is utilized for properly spacing the rotatable bearing members apart so that they will not come in contact with each other, as set forth in my prior Patents Nos. 1,111,550 and 1,188,126; and in which means is utilized for maintaining alignment of the rotatable bearing members; and the present invention is an improvement upon the construction set forth in my copending application, Serial No. 726,543, filed May 19, 1934.

In the construction shown in my copending application, rotatable bearing members are utilized having main bearing portions either ball or spherically shaped or generally convex which run in concaved inner and outer raceway grooves, and carry both thrust and radial loads; and these rotatable bearing members are provided with trunnions interposed between series of spacing balls running in concentric floating raceway rings.

When such a bearing is operating under only a radial load, there may not be any tendency of the trunnions to tilt toward or away from the axis of the shaft which the bearing serves; but if the bearing is operating under both radial and thrust loads, there may be a tendency of the trunnions of the rotatable bearing members to tilt toward or away from the axis of the shaft which the bearing serves. Such a tilting action may produce considerable friction in the bearing or cause the same to bind, if the working clearances between the trunnions and the spacing balls accumulate to any considerable amount.

It is therefore an object of the present invention to provide an anti-friction bearing in which rotatable load bearing members having trunnions, carry both thrust and radial loads; in which the rotatable members are maintained spaced apart so that they will not come in contact with each other; and in which the spacing means is utilized for maintaining the trunnions in alignment axially of the bearing.

It is a further object of the present invention to provide an antifriction bearing having rotatable bearing members carrying both thrust and radial loads; which rotatable bearing members are provided with trunnions that are maintained in alignment axially of the bearing; which bearing may be operated for an indefinite period of time without grease or other liquid lubricant; which bearing may be completely and substantially permanently sealed up so as to prevent dirt, grit and comminuted particles which may be present in the region of the place of operation of the bearing, from accumulating in and around bearing parts; and in which bearing, only true rolling motion occurs between all relatively movable contacting parts, with the possibility of binding, skewing or tilting of the bearing members, and undue friction incident thereto, being eliminated.

And finally, it is an object of the present invention to provide an improved and simplified anti-friction bearing construction incorporating all of the described desiderata, which requires only a relatively small number of parts in its construction, and which is efficient and substantially fool-proof in operation and use.

These and other objects may be obtained by the improved anti-friction bearing construction, a preferred embodiment of which is shown in the accompanying drawing, and is hereinafter described in detail and claimed, which may be stated in general terms as including in anti-friction bearing construction, inner and outer raceway members and rotatable thrust and radial load bearing members rolling on and between the raceway members, two preferably grooved trunnions projecting axially of the bearing from each rotatable member between the raceway members, a series of spacing balls interposed between the trunnions, an outer floating raceway ring retaining each series of balls, and the cylindrical locus of the axes of rotation of the rotatable bearing members and grooved trunnions thereof being located inside of the circular locus of the centers of rotation of the spacing balls whereby the axes of the trunnions are maintained parallel to the axis of the shaft which the bearing serves, and whereby the spacing balls are retained in their floating raceway rings.

In the drawing,

Figure 1 is an axial section of an embodiment of the improved bearing construction utilized for journalling a rotating shaft, taken on the line 1—1, Fig. 2;

Fig. 2 is a transverse elevation section through the improved bearing taken on the line 2—2, Fig. 1; and Fig. 3 is a diagrammatic fragmentary sectional view showing the improved bearing construction in full lines and diagrammatically showing in dot-dash lines the tilting action of the rotatable bearing members which the present improvement prevents, taken on the line 3—3, Fig. 1.

Similar numerals refer to similar parts throughout the drawing.

Although it is to be understood that the antifriction bearing construction of the present invention is applicable to any installation where there is to be relative rotary motion between the parts, as between a wheel or the like rotating on a stationary shaft or between a rotating shaft journalled in a stationary bearing, the particular embodiment shown and described herein, is one in which a stationary bearing housing is utilized for journalling a rotating shaft.

The shaft is generally indicated at 4 and may include a journal portion 5 terminating at one end in an abutment shoulder 5a and at the other end in a threaded portion 5b which may continue in the shaft portion 6 of reduced diameter with respect to the main shaft 4. A one-piece inner annular raceway member 7 may be fixed to the journal portion 5 of the shaft by being keyed thereto at 8; and the member 7 is clamped against the shoulder 5a by the nut 9 threaded on the threaded portion 5b of the shaft. The inner raceway member 7 has formed therein a generally concaved, preferably curved annular raceway groove 10.

The journal box preferably comprises a housing formed by housing members 11 and 12, secured together by through bolts 13 and nuts 14. The end plate portions of the housing members 11 and 12 are provided with central openings 15 and 15', respectively, which may be recessed at 16 and 16' to receive annular washers 17 and 17' of felt or other suitable material, and the washers are clamped to the end plate portions of the housing members 11 and 12 by the rings 18 and 18' which are preferably secured thereto by screws 19.

An additional felt washer 20 is preferably interposed in the recess 21 between the end plate portion of the housing member 11 and the nut 9; and an additional felt washer 20' is preferably interposed in a recess 21' between the end plate portion of the housing member 12 and the inner raceway member 7.

The felt washers 17, 17', 20 and 20' accordingly provide sealed and dust-proof joints between the ends of the journal box formed by the housing members 11 and 12 and the shaft portions 4 and 6, whereby all dust, dirt, grit and other comminuted material is prevented from entering the inside of the journal box and the bearing parts mounted and moving therein.

An outer annular raceway member may be fixed to the journal box by utilizing, for convenience of manufacture and assembly, two outer raceway portions 22 and 23, rabbeted together at 24, bolted together by bolts at 25, and clamped to and within the journal box between the housing members 11 and 12 in annular grooves 26 formed therein. Thus, the outer raceway member portions 22 and 23 and the securing, clamping and mounting parts therefor may be collectively referred to as an outer raceway member having a generally concaved, preferably curved annular raceway groove 27, formed therein.

The rotatable bearing members 28 are located as a series in the interval between the inner and outer raceway members for rolling on and between the raceway surfaces 10 and 27; and the rotatable bearing members 28 are preferably ball or spherically shaped and are provided with axial trunnions 29, which are provided adjacent their ends with annular grooves 30.

A series of spacing balls 31 is located between the grooves 30 of the trunnions 29 at each end of the rotatable bearing members 28, which balls 31 are retained in position by the annular raceway rings 32, formed in the outer annular raceway rings 33. The raceway rings 33 are freely positioned within the housing between the raceway members 22 and 23 and the housing members 11 and 12 so that the raceway rings 33 may be referred to as freely floating rings.

As best shown in Fig. 2, the raceway rings 33 may be provided with grooves or notches 34 communicating with the annular grooves 32 therein for facilitating the assembling of the spacing balls 31; and the ends of two adjacent trunnions 29 of the rotatable bearing members 28 may also be provided with grooves or notches 35, communicating with the grooves 30 whereby the last ball 31 may be assembled into and between the grooved trunnions and the floating raceway rings 33. Of course, it is to be understood that any other desired means may be utilized for assembling the balls 31 in and between the raceway rings 33 and the grooves 30 of the trunnions 29.

The inner raceway member 7, the outer raceway member portions 22 and 23, the rotatable bearing members 28, the spacing balls 31, and the raceway rings 33 are all preferably formed from hardened steel with the ball and grooved raceway surfaces thereof accurately ground, whereby true rolling contact and motion is obtained between all relatively movable contacting bearing parts.

Moreover, the main bearing portions of the rotatable bearing members 28 by being generally convex, by being preferably ball or spherically shaped, and in rolling on and between the concaved raceway grooves 10 and 27, enable both radial and thrust loads to be transmitted from the shaft 4 to the journal box; and these thrust and radial loads are both carried directy by the rotatable main bearing members 28.

As best shown in Fig. 2, the cylindrical locus of the axes of rotation of the trunnions 29 of the rotatable bearing members 28 has a substantially smaller diameter and is located a considerable distance radially inside of the circular locus of the centers of rotation of the spacing balls 31.

By this construction, the spacing balls maintain the axes of the trunnions 29 parallel to the axis of the shaft 4 at all times, thereby preventing any tilting or skewing of the main bearing members 28 and avoiding friction losses and decreased bearing efficiency which would be otherwise incident to such tilting or skewing.

Moreover, this same arrangement of the inward location of the axes of the trunnions 29 with respect to the centers of the spacing balls 31 eliminates the necessity of providing an inner floating raceway ring for the spacing balls 31; so that while the spacing balls 31 maintain spacing of and alignment of the main rotatable bearing members 28, the main rotatable bearing members 28 in turn retain the spacing balls 31 in the floating raceway rings 33 therefor.

Moreover, the arrangement of the bearing members 28 and spacing balls 31 requires the rotatable bearing members 28 always to roll in a true planetary manner in the raceway grooves 10 and 27; and only pure rolling motion occurs between all relatively movable contacting parts of the bearing, and all sliding motion is eliminated, which if present would result in frictional resistance and would require lubrication.

As shown in Fig. 3, if one of the trunnions 29 were to tilt outward, as to the position shown by dot-dash lines at A, the same would have to force the spacer balls 31 apart to the position shown by dot-dash lines at B, in order to permit such outward movement. However, the adjacent trunnions 29 prevent the spacer balls 31 from being forced apart to the position shown at B, and thus the particular arrangement of trunnions and spacer balls maintain alignment of the combined thrust and radial load carrying rotatable bearing members 28.

The improved bearing may be operated without any lubricant whatsoever; and if the journal box is properly sealed against the entrance of comminuted dirt, dust particles and the like, which would have an abrasive action on the moving parts, the bearing may be operated for an indefinite period of time without any grease or liquid lubricant whatsoever.

It is, however, to be understood that if desired, a small amount of lubricant of some character may be initially placed within the journal box, more for the prevention of rust than for lubrication purposes, perchance moisture enters into or becomes entrapped within the bearing box.

I claim:—

1. In anti-friction bearing construction, inner and outer raceway members and rotatable thrust and radial load bearing members rolling on and between the raceway members, trunnions projecting axially of the bearing from each rotatable bearing member between the raceway members, series of spacing balls between the trunnions, a separate outer floating raceway ring retaining each series of balls, and the locus of the axes of rotation of the trunnions being spaced radially inward of the locus of the centers of rotation of the spacing balls whereby the rotatable bearing members and trunnions thereof are maintained in alignment axially of the bearing.

2. In anti-friction bearing construction, inner and outer raceway members and rotatable thrust and radial load bearing members rolling on and between the raceway members, grooved trunnions projecting axially of the bearing from each rotatable bearing member between the raceway members, a grooved outer floating raceway ring adjacent each end of the raceway members, a series of spacing balls interposed between and retained by the floating raceway ring and adjacent grooved trunnions, and the locus of the axes of rotation of the trunnions being spaced radially inward of the locus of the centers of rotation of the spacing balls whereby the rotatable bearing members and trunnions thereof are maintained in alignment axially of the bearing.

3. In anti-friction bearing construction, grooved inner and outer raceway members and ball-shaped rotatable thrust and radial load bearing members rolling on and between the grooved raceway members, grooved trunnions projecting axially of the bearing from each rotatable bearing member between the raceway members, a grooved outer floating raceway ring adjacent each end of the raceway members, a series of spacing balls interposed between and rolling on and between the grooved raceway ring and adjacent grooved trunnions and the locus of the axes of rotation of the trunnions being spaced radially inward of the locus of the centers of rotation of the spacing balls whereby the rotatable bearing members and trunnions thereof are maintained in alignment axially of the bearing and whereby the spacing balls are retained by the grooved trunnions and outer floating raceway rings.

ODELL WILSON.